March 17, 1925.
G. HOEPNER
1,530,117
AUTOMATIC CARTON SEALING MACHINE
Filed May 15, 1922    9 Sheets-Sheet 1
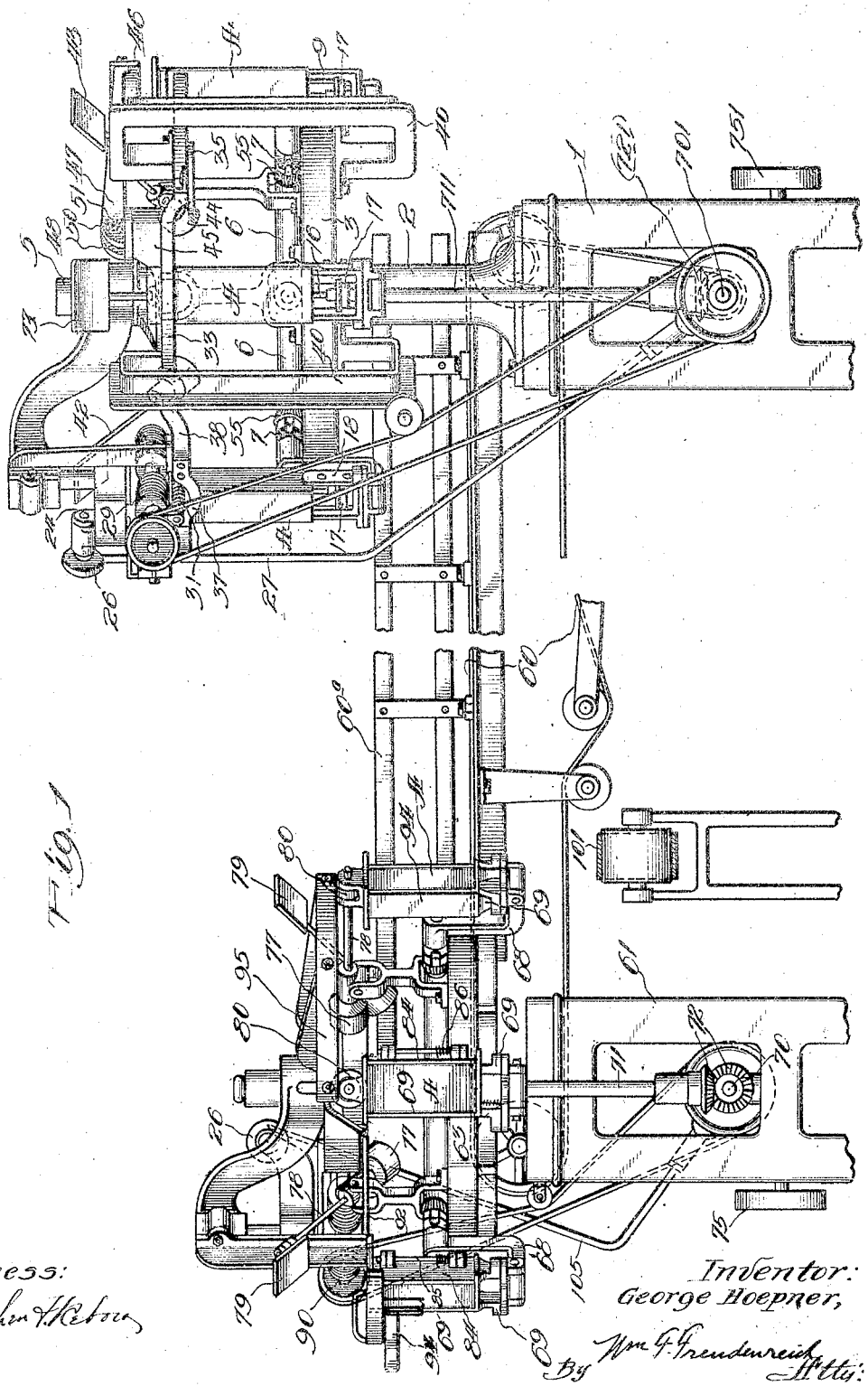
Witness:
Inventor:
George Hoepner,
By Wm. G. Freudenreich
Atty.

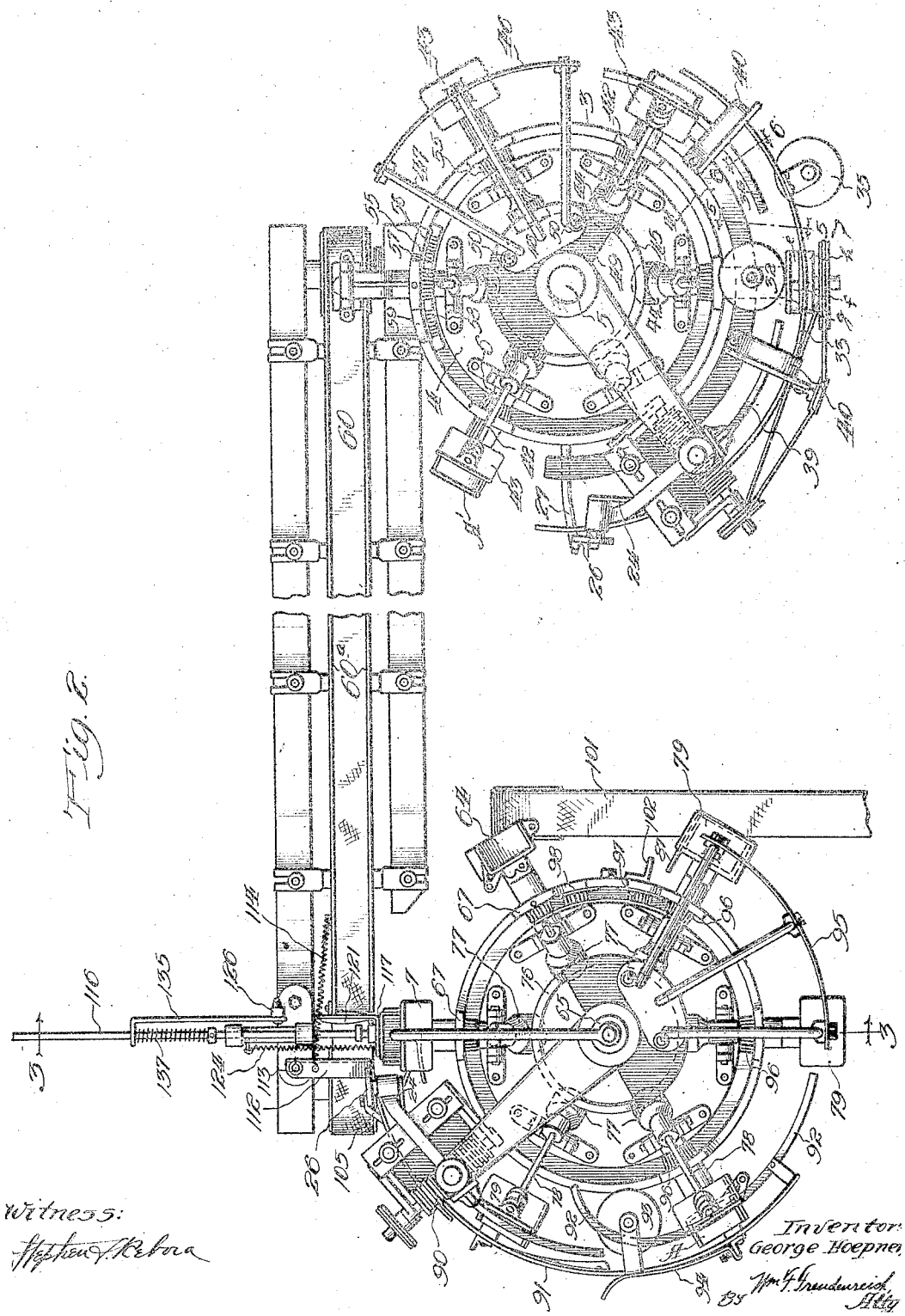

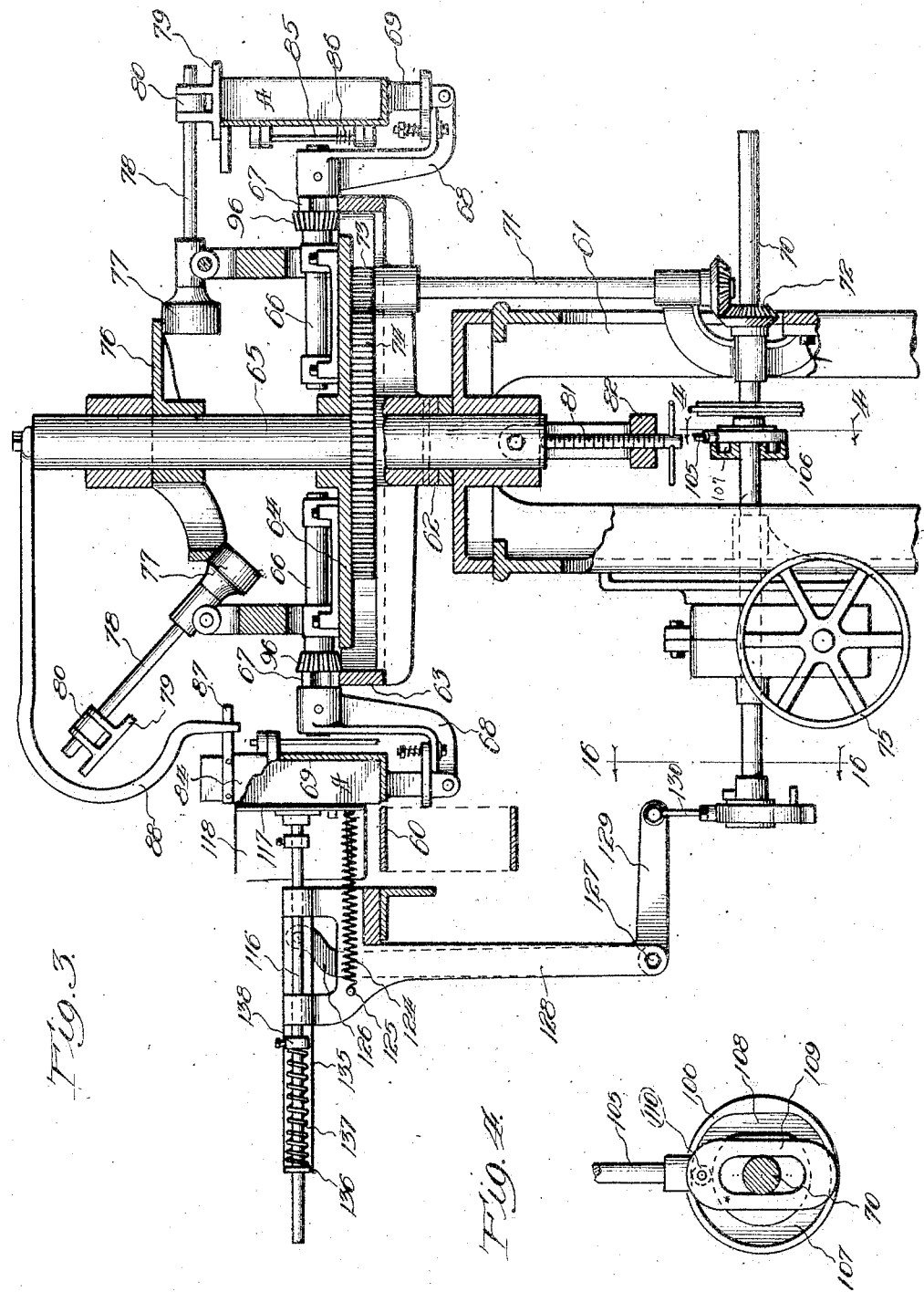

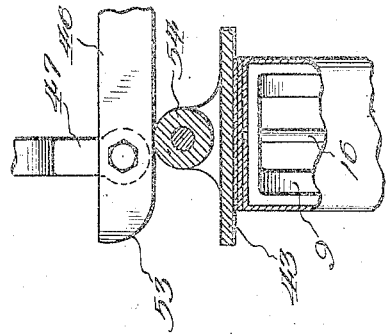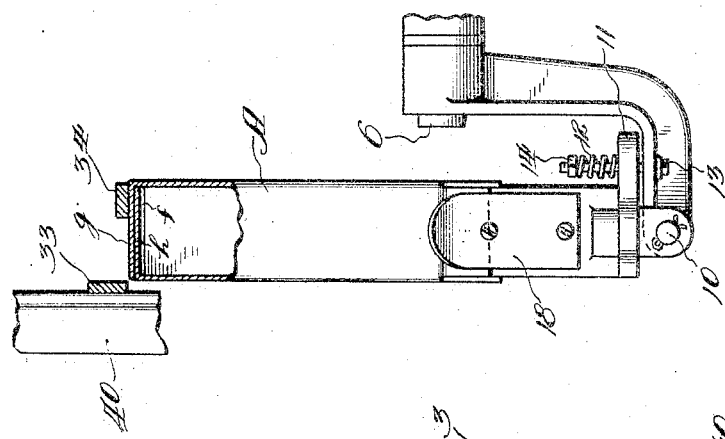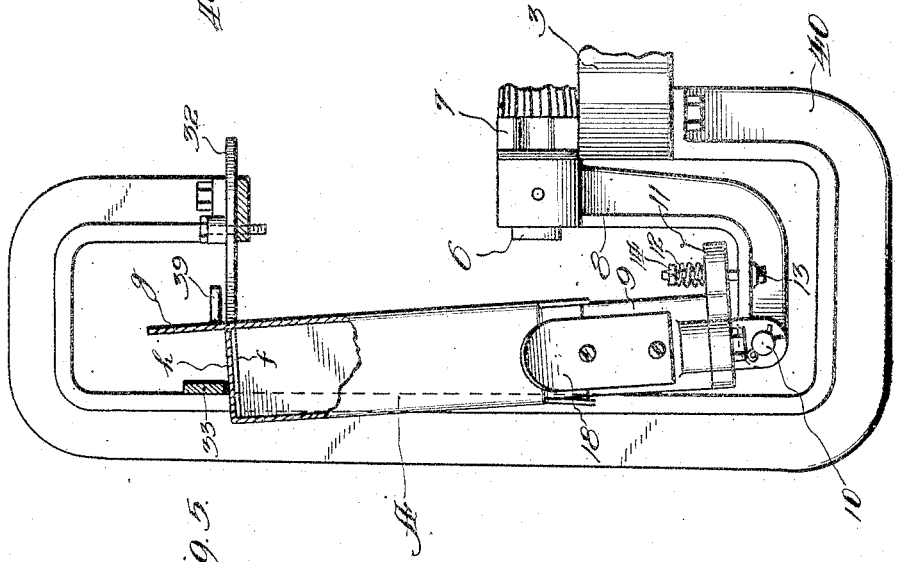

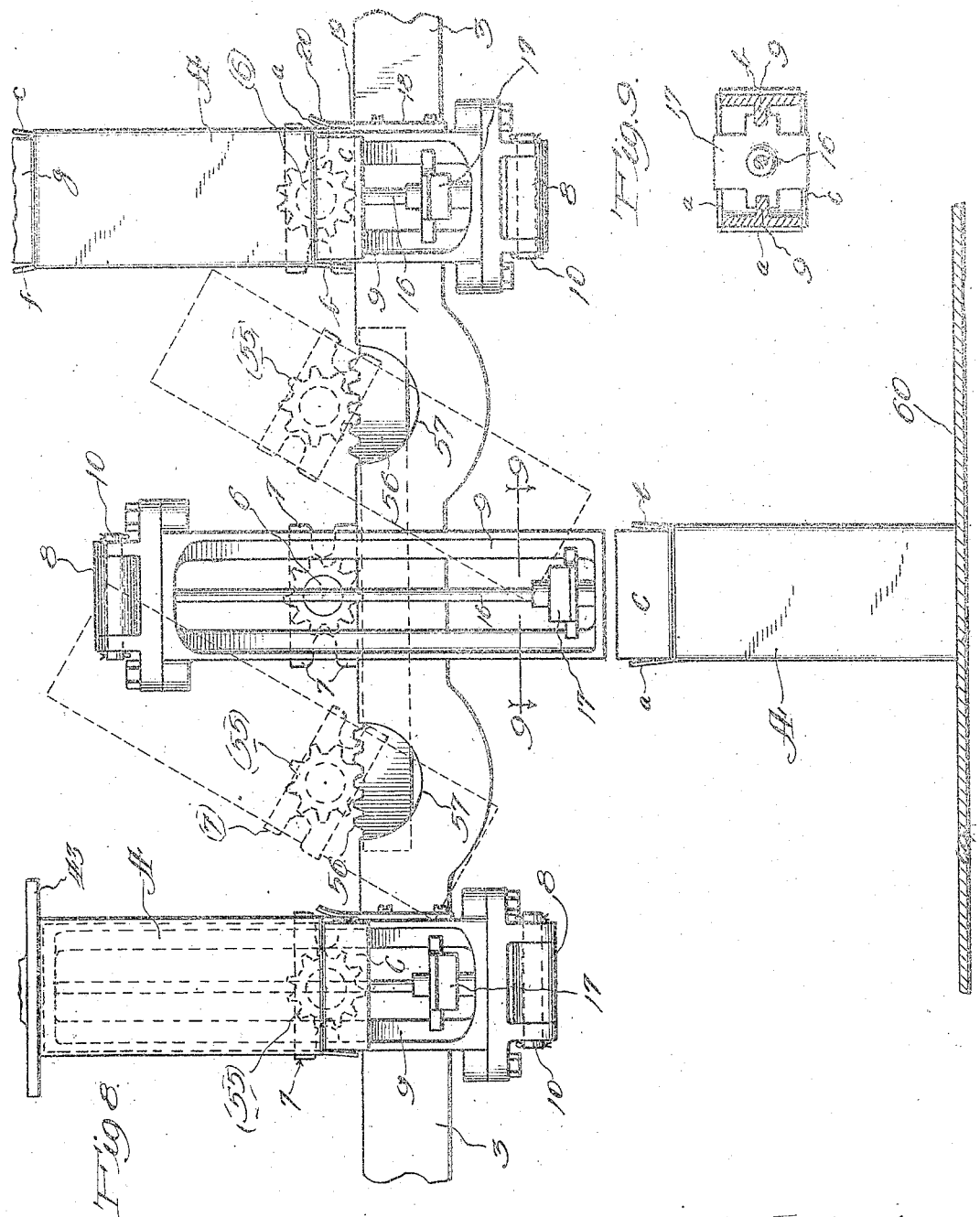

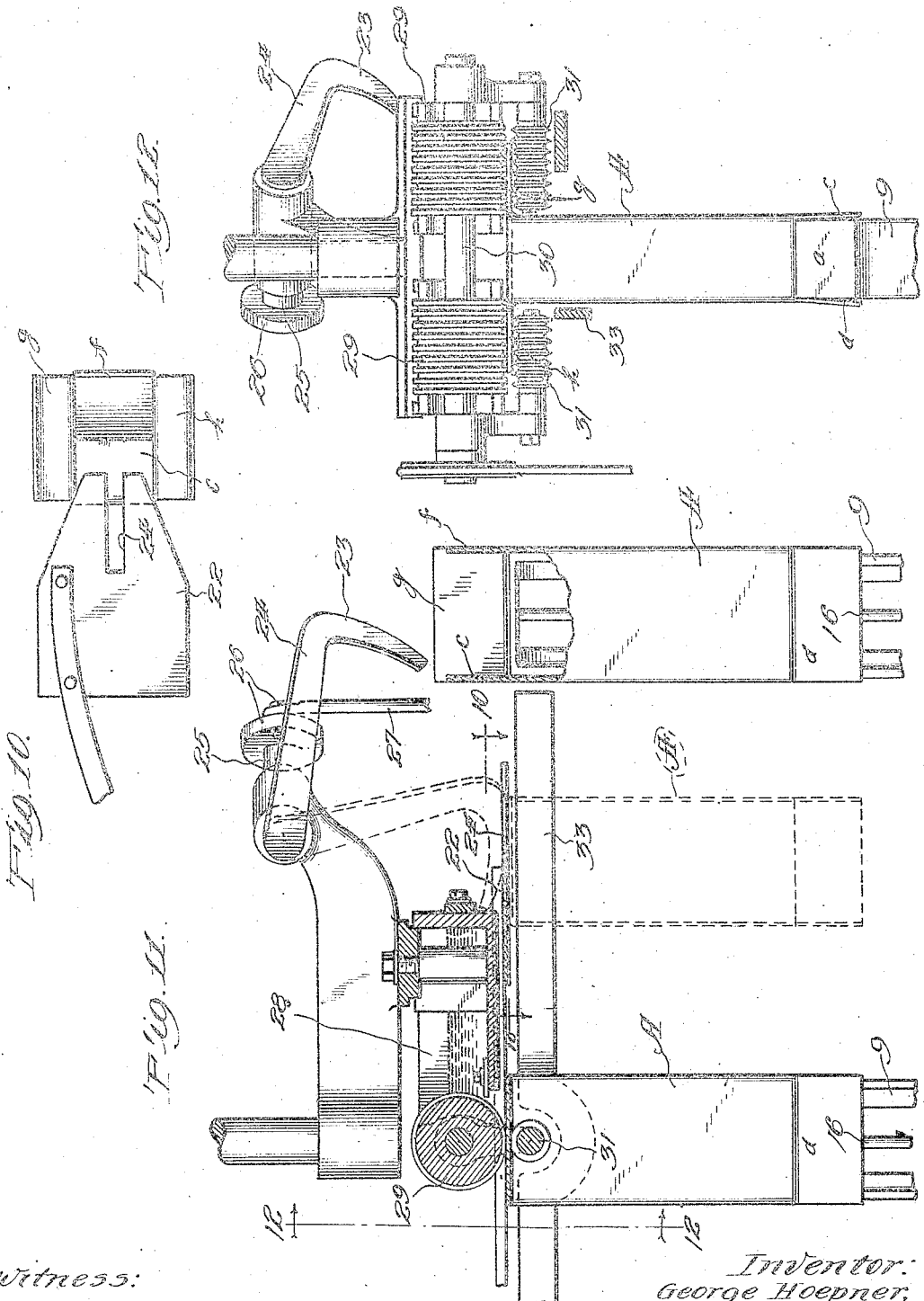

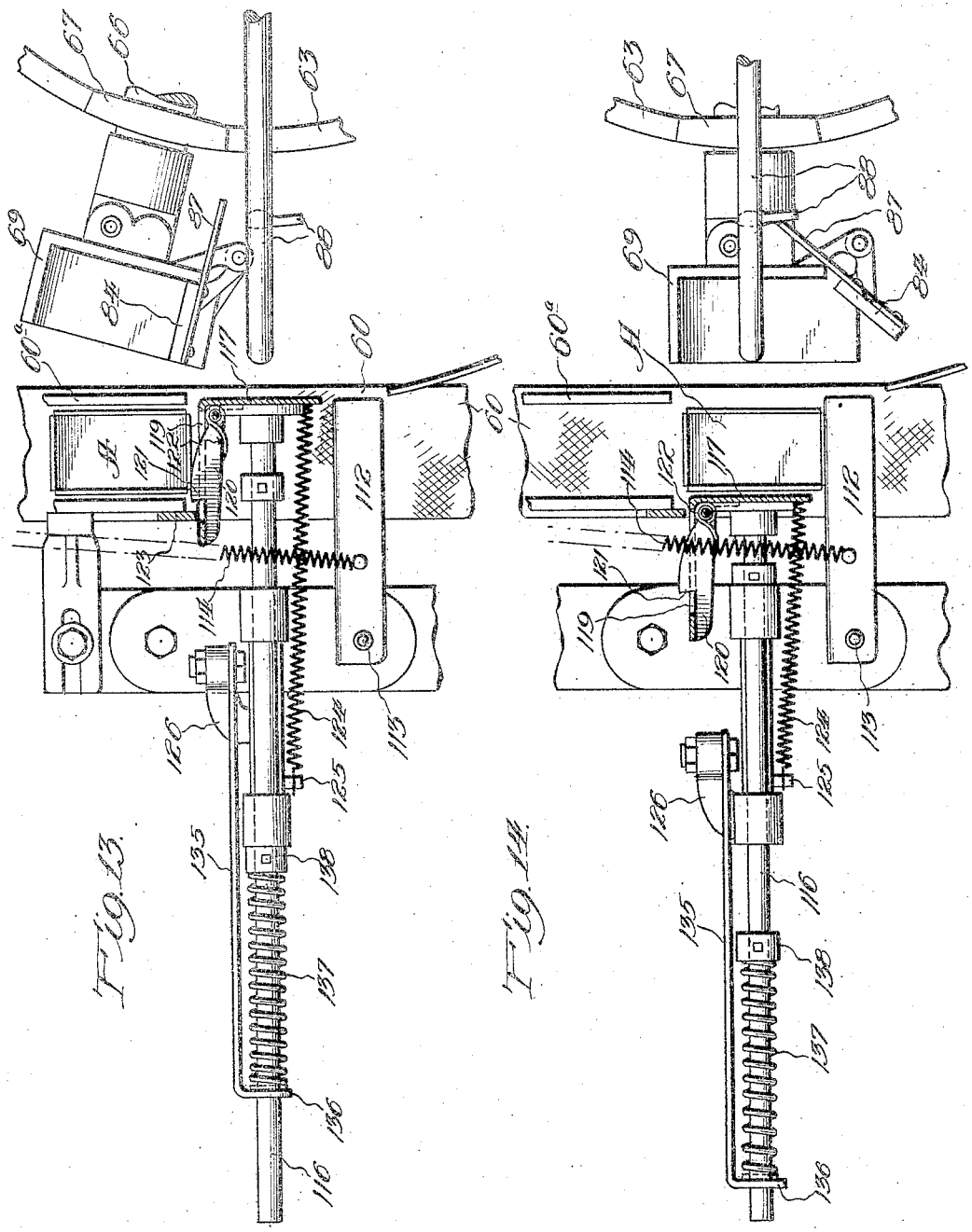

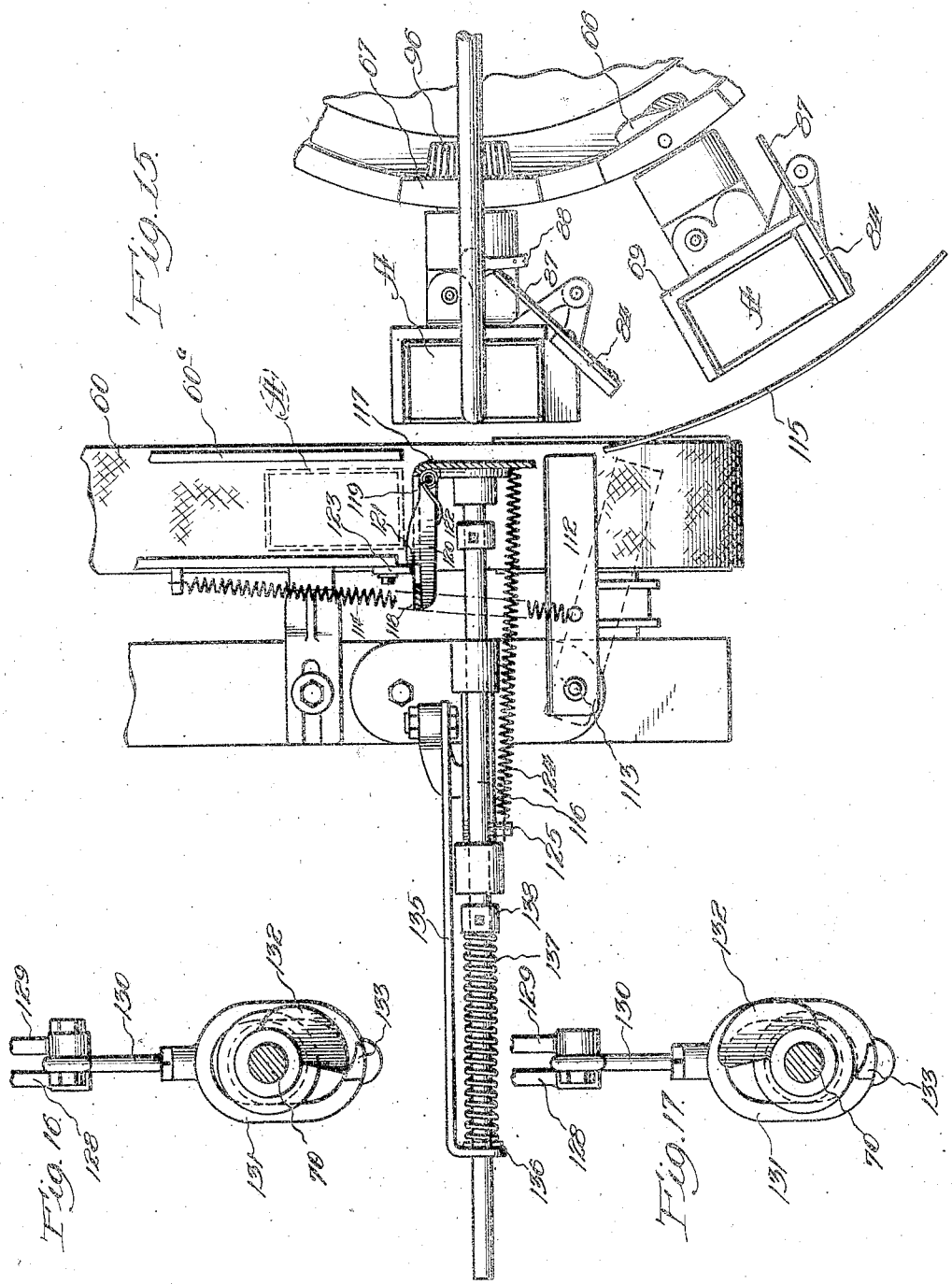

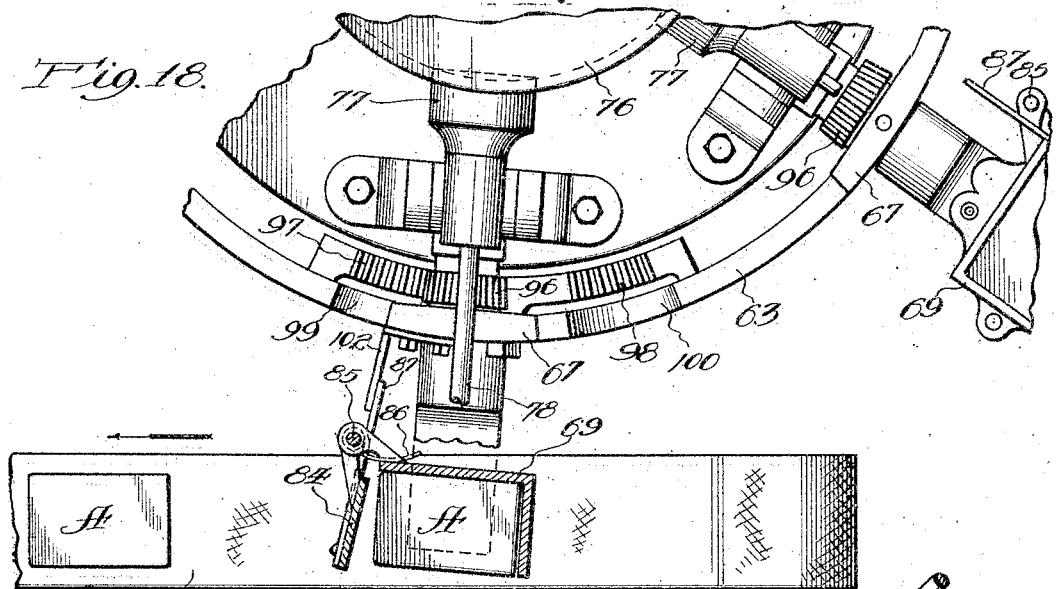
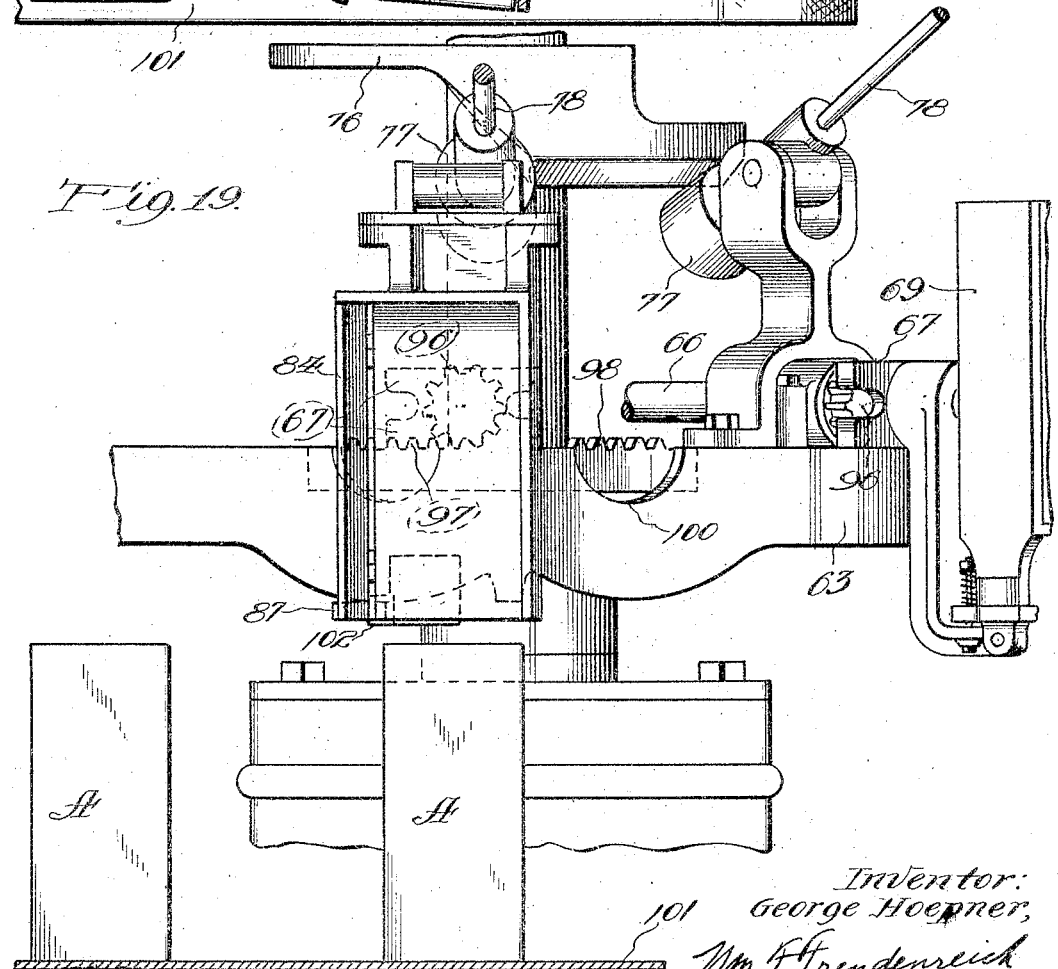

Patented Mar. 17, 1925.

1,530,117

UNITED STATES PATENT OFFICE.

GEORGE HOEPNER, OF CHICAGO, ILLINOIS.

AUTOMATIC CARTON-SEALING MACHINE.

Application filed May 15, 1922. Serial No. 561,045.

*To all whom it may concern:*

Be it known that I, GEORGE HOEPNER, a citizen of the United States, residing at Chicago, county of Cook, State of Illinois, have invented a certain new and useful Improvement in Automatic Carton-Sealing Machines, and declare the following to be a full, clear, and exact description of the same, such as will enable others skilled in the art to which it pertains to make and use the same, reference being had to the accompanying drawings, which form a part of this specification.

Specifically considered, my invention relates to the art of closing the flaps at both ends of a carton which may be filled with goods of any desired kind and in any desired way between the operation of closing the one end and the operation of closing the other end; and it has for its object to produce a machine which shall be simple in construction and efficient and reliable in operation.

A further object of the present invention is to produce a carton sealing machine which will deliver cartons in such positions that they will stand on the ends that have just been sealed so that the weight of the carton or of the carton and its contents, will be effectively applied to press the parts of the glued joint together.

A further object of the present invention is to produce a simple and novel machine in which the end that is sealed is always the upper end, whereas the cartons are automatically discharged in such a manner that the ends that have just been sealed are the lower ends.

A further object of the present invention is to produce a simple and novel machine in which three or four flaps at one end of a carton will be caused to be folded in by means of stationary devices so that only the fourth flap need be folded in by means of a movable finger or the like.

A further object of the present invention is to produce a simple and novel mechanism whereby filled cartons, open at the top, will automatically be fed from a conveyor into a holder, for the purpose of sealing the same, in such a manner that the feeding mechanism will be positively controlled by individual cartons as they reach a predetermined point, thus insuring perfect synchronism between the feeding of cartons and the movement of the sealing carrier when there are cartons to be delivered to the carrier, and preventing the operation of the feeding mechanism at other times.

A further object of the present invention is to produce a simple and novel feeding and sealing mechanism for cartons which will insure against the breaking of or damage to the mechanism in case one or more cartons should happen to become jammed in the machine.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is what may be termed a front elevation of a machine arranged in accordance with a preferred embodiment of my invention, parts being broken away;

Fig. 2 is a top plan view of the machine;

Fig. 3 is a section on an enlarged scale taken approximately on line 3—3 of Fig. 2;

Fig. 4 is a section, on an enlarged scale, taken approximately on line 4—4 of Fig. 3, showing the cam for actuating the finger which folds one of the flaps on the end of the carton which is the first to be sealed;

Fig. 5 is an elevation on an enlarged scale, taken approximately on line 5—5 of Fig. 2;

Fig. 6 is a view on the same scale as Fig. 5 taken approximately on line 6—6 of Fig. 2;

Fig. 7 is a detail illustrating the immediate means for applying pressure to the completed closure at one end of the empty carton;

Fig. 8 is a diagrammatic view illustrating the cycle of movements of the holder for the empty cartons;

Fig. 9 is a transverse section through one of the holders for the empty carton taken, for example, on line 9—9 of Fig. 8;

Fig. 10 is a top plan view of the spreading device for folding one of the flaps of a carton inwardly and spreading or folding outwardly two adjacent flaps, the device being shown in operative relation to a carton, or it may be said to be a section on line 10—10 of Fig. 11;

Fig. 11 is a vertical section, on an enlarged scale, through the machine for sealing the empty cartons, at the glue-applying devices therein;

Fig. 12 is a section taken approximately on line 12—12 of Fig. 11;

Fig. 13 is a top plan view, on an enlarged scale, of the mechanism for feeding cartons from a conveyor into the carrier in which they are sealed;

Fig. 14 is a view similar to Fig. 13, showing the parts in different positions from those occupied in Fig. 13;

Fig. 15 is a view similar to Figs. 13 and 14 showing the parts in still different positions;

Fig. 16 is a section on an enlarged scale, taken approximately on line 16—16 of Fig. 3, showing the cam actuator for the feeding mechanism;

Fig. 17 is a view similar to Fig. 16 showing the parts in different positions than in Fig. 16;

Fig. 18 is a top plan view of a fragment of the sealing machine for filled cartons, illustrating the manner of discharging the sealed cartons therefrom; and Fig. 19 is a side elevation of the parts shown in Fig. 18, that is a view looking upwardly against the lower end of Fig. 18.

In a sense my invention may be said to constitute three machines, one for closing one end of empty cartons; another for delivering the cartons, open end up, to a second sealing machine; and said second sealing machine for closing the open tops of the cartons after they have been filled. However, the two sealing machines are alike except for certain details due to the difference between the requirements for handling empty cartons open at both ends and filled cartons open at one end only.

The machine for sealing the empty cartons at one end only is shown at the right hand ends of Figs. 1 and 2. On a suitable base 1 is mounted a pedestal 2 at the upper end of which is carried a large circular track 3 whose center is at the axis of the pedestal. Within the track and concentric therewith, is a table 4 adapted to revolve about a heavy stationary cylindrical post or shaft 5 rising from the pedestal. These parts are very similar to and are driven in the same way as those of the sealing machine at the left hand end of Figs. 1 and 2 and will be described more in detail in connection with the latter. Extending radially of the table, on top thereof, are a plurality of shafts of which there are six in the arrangement shown, each shaft being rotatable about its own axis. On each shaft is fixed a shoe 7, as best shown in Fig. 8, having a flat face resting on the circular track so as to hold the shaft against rotation. Fixed to the outer end of each of these shafts is an L-shaped bracket 8 one arm of which extends radially from the shaft and the other parallel to the shaft at the outer end of the radial arm. On each of these brackets is supported a carton holder or form which, as best shown in Figs. 5 to 8, includes a metal frame-like part 9 hinged at one end to the free end of the horizontal arm of the corresponding bracket, as indicated at 10, so as to permit it to swing from and toward the end of the corresponding supporting shaft. Each frame or form has a foot-piece 11 extending inwardly along the supporting arm of the bracket. A spring 12, acting on this foot-piece, tends to hold the form at right angles to the corresponding supporting shaft but permits the upper end of the form to be tilted outwardly when sufficient pressure is applied. In the arrangement shown, the spring 12 is placed on top of the foot-piece while a bolt 13 passes through the underlying arm of the bracket, through the foot-piece and through the spring; a nut 14 engaging with the top of the spring so that when the upper end of the form is tilted outwardly the spring is compressed between the foot-piece and the nut and thereafter tends to return the form to its normal position. Arranged at the longitudinal center of each frame-like form is a guide rod 16 on which is loosely fitted a weight 17 adapted to slide up and down the rod. The form is considerably longer than a carton the end of which is to be sealed and is of such cross section that the carton will fit thereon and be held against distortion while the sealing is taking place. On one side of each form or holder, near the hinged end, is fastened a clip 18 which, as best shown in Fig. 8, is provided with an upwardly-directed shoulder 19 so located that when the edge of the lowermost flap $a$ on a carton A, surrounding the form, rests thereon, the upper end of the body of the carton will be flush with the upper end of the form, the flaps at the upper end projecting beyond the top of the form. The upper end of the clip is flared outwardly as indicated at 20, so that the flap $a$ will be guided and directed inwardly when a carton is inserted on the form, thus insuring that the flap will seat itself on the shoulder. The table constantly revolves when the machine is in operation. The cartons are placed, one at a time, on the forms as they reach the position of that form in Fig. 2 on which the carton A' is shown. As the table travels in the counterclockwise direction, as viewed in Fig. 2, the carton that has just been placed on the form passes underneath a stationary plate 22, best shown in Figs. 10 and 11, this plate folding the advance flap *e* inwardly and spreading the two side flaps *g* and *h* outwardly so that they will lie horizontal. In order to insure that the device 22 will spread the two side flaps I make the advance end more or less pointed or wedge shaped so that the extreme width of the plate at the advance end is less than the width of the carton. Therefore, even though the flaps *g* and *h* should happen to lie in such positions that they are partially folded in, the plate will pass between the lower ends thereof and spread them out. Just as the carton passes under the plate 22 a finger 23 moves downwardly and quickly folds in the trailing flap *f*. This flap *f* must be folded down before it reaches the plate but, in order that the finger may follow through, I provide the plate with a slot 24 extending inwardly from the front edge in the path of the finger, so that the finger may remain in contact with the flap after the work of folding the flap in has been completed. The finger 23 is preferably arranged approximately at right angles to the free end of a rocker arm 24 arranged above the folding and spreading plate 22; the rocker arm being attached to one end of a rock shaft 25 provided with a crank 26 attached to the upper end of a connecting rod 27 suitably driven in proper time relation to the machine so as to cause the arm and finger to move from the position shown in full lines in Fig. 11 to that shown in dotted lines from the time one of the forms or holders begins to pass underneath the pointed end of the folding and spreading plate to the time when the form passes completely underneath said plate. Just above the folding and spreading plate is a receptacle 28 for containing adhesive material. The rear end of the receptacle is closed by means of a glue roll 29 which is conveniently made in two sections mounted on a rotatable shaft 30. Underneath each of the sections of the glue roll is an idle roll 31. The glue roll is preferably provided with annular grooves spaced apart short distances from each other while the idle rolls are preferably provided with annular ridges triangular in cross section. As the carton is carried ahead, the flaps *g* and *h* pass between the idle rolls and the glue rolls, as best shown in Figs. 11 and 12; the idle rolls being so adjusted that they will press the flaps upwardly against the glue rolls. The idle rolls must of course be spaced far enough apart to permit the cartons to pass between them. By this arrangement the upwardly-directed faces of the two side flaps of the carton are provided with strips or bands of adhesive material as the flaps pass underneath the glue rolls. After passing through the adhesive-applying apparatus the form is engaged on the inner side by means of a suitable deflecting device which may conveniently take the form of a rotatable wheel or disc 32 which tilts the upper end of the form outwardly as shown in Fig. 5, so that the upper end of the form passes underneath a stationary annular rail 33, causing the outermost side flap *h* to be folded inwardly as shown in Fig. 5. The face to which the adhesive material was applied is now the under face and the adhesive material will therefore come in contact with the flaps *e* and *f*. After the form passes the deflecting device, that is the disc or wheel 32, the spring 12 at the base thereof tends to swing the form back to its normal upright position and, in so doing, it causes the remaining unfolded flap *g* to be folded inwardly across the top of the carton by reason of being carried underneath a second curved stationary rail 34 lying on the inner side of the form; the condition being now that shown in Fig. 6. In order to insure that the flap *g* will be folded in, without relying entirely on the spring to return the form or holder to its normal position, a second wheel or disc 35 may be employed, this wheel or disc being so located that it will engage with the outer side of the form or holder when it comes opposite the advance end of the rail 34 and force the holder back into its normal upright position.

The rail 33, as best shown in Fig. 1, begins underneath the glue rolls as indicated at 37 and then rises gradually, as indicated at 38, so that the flap *h*, as it leaves the glue rolls, is gradually swung into a vertical position which it attains before the disc or wheel 32 is reached. There will be enough resiliency in the flaps, however, to cause them to spring into more or less upright positions after they leave the glue rolls and therefore no special deflecting or guiding device for the flap *g* need be provided. I prefer, however, to provide a rail 39 underneath which the cartons will ride as they leave the glue rolls, so that the flaps *e* and *f* will be prevented from rising before one of the side flaps can be folded down. The several rails may conveniently be supported from C-shaped yokes 40 fastened at their lower ends to the annular track 3. To the upper inner ends of the yokes is fastened a curved rail 41 which supports the disc or wheel 32.

After the end of a carton has been sealed it is desirable to place the glued joint under pressure until the glue has had a chance to take at least a preliminary set. To this end I arrange above each of the radial shafts 6 a swinging arm 42 having at its outer end a plate 43 adapted to engage with the top of the carton after it has passed from underneath the rail 34. At the inner end of each of the arms is a roller 44 adapted to ride underneath an annular cam track 45 fixed on the shaft or post 5. This cam track is similar to that forming part of the other sealing machine and will be described more in detail hereafter. However, it is sufficient to state that the cam track is so shaped that it will press down on the rollers at the inner ends of the arms so as to hold each presser plate 43 raised during the greater portion of a revolution of the table. Just before a carton passes from underneath the rail 34, the corresponding presser plate is allowed to drop down on the rail so that when the carton leaves the rail it will be instantly engaged by the presser plate. Beyond the rail 34 is another rail 46 arranged at a higher elevation than the rail 34 so that the presser plate will ride under the same and be forced thereby with considerable pressure against the sealed end of the carton. The rail 46 is supported on the outer ends of some radial arms 47 attached at their inner ends to a plate 48 resting on a platform 49 forming the top of the cam track 45. The plate 48 rests loosely on its support, being held thereto by means of bolts 50 passing upwardly through the same and having thereon springs 51 interposed between the bolt heads and the top of the plate. Consequently when sufficient upward pressure is applied against the under side of the rail 46, the rail may be lifted against resistance of the springs 51. The advance end of the rail 46 is preferably rounded or inclined upwardly, as indicated at 53 in Fig. 7, so that whenever a presser plate reaches the rail it will serve to lift the latter and thus bring the pressure of the springs into play. Each presser plate may conveniently be provided on the top thereof with a small roller or wheel 54, Fig. 7, adapted to engage with the rail 46 so as to reduce the frictional resistance.

After the carton has been carried underneath the rail 46 the glued joint has been set sufficiently to permit the carton to be safely removed. The sealing takes place at the upper end of the carton and, after the sealing has been effected, I prefer to remove the carton in such a way that it will rest on the sealed end; thus not only bringng the weight of the carton to bear on the glued joint but placing it in a position ready for filling through the open end. For this purpose I have provided means for turning each carton holder or form upside-down after it leaves the presser rail and at the same time stripping the carton therefrom. This is accomplished by providing each of the radial shafts 6 with a pinion 55 fixed thereon at a point just inside of the annular track 3. Just beyond the rail 46 is a curved rack 56 lying in the path of travel of the several pinions and of such a length that whenever one of the pinions travels over the same, the pinion is turned through an angle of 180 degrees. In radial alignment with the rack 56 is a depression 57 in the annular track. As heretofore explained, each of the radial shafts is provided with a shoe resting on the annular track to prevent the shaft from rotating, and the purpose of the depression 57 is to provide clearance for this shoe during the time that it is desired to rotate its shaft so as to turn the carton upside-down. Beyond the rack 56 is a similar rack 58 and opposite this latter rack is a second depression 59 in the annular track. Consequently each radial shaft, and therefore each carton holder, will be turned through two successive angles of 180 degrees, in the same direction. The operation of this part of the machine is best illustrated in the diagrammatic view in Fig. 8. Referring to this figure, the left hand holder or form is just approaching the point where it is to be rotated and, although the presser plate 43 is still in engagement with the sealed end of the carton, the cam track is about to lift this presser plate out of the way. As the carton travels toward the right, the pinion 55 meshes with the rack 56 and the supporting shaft for the form or holder begins to rotate; the depression in the annular track leaving the guide shoe free to rotate with the shaft. It is not essential that the complete rotary movement be effected by the rack and pinion because the depression in the track may be so shaped that after the shoe has been partially rotated, the continued forward movement thereof with the table will cause the shoe to strike against the bounding wall of the depression ahead of it so that the shaft will be turned by the shoe until the shoe again lies flat on the track as shown in the second full line position. As the carton holder or form approaches the second full line position, the sealed end of the carton becomes the bottom instead of the top and the carton tends by gravity to drop from the form or holder. The stripping of the carton from the form or holder is insured by means of the sliding weight 17 which is loosely mounted on the rod 16. It will be seen that this weight lies near the hinged end of the form or holder in the first full line position, at some distance below the carton. Therefore, when the holder is turned through an angle of 180 degrees the weight slides downwardly along the supporting rod and strikes a light blow on the free upper edges of the two side flaps $c$ and $d$ of the carton as indicated in Fig. 9. The empty holder continues to travel ahead and, when it reaches the second dotted line position it is again rotated through an angle of 180 degrees, placing it in position ready to receive another carton with both its ends unsealed, as indicated in the second full line position where the holder is shown with a carton applied thereto ready to be carried through the sealer.

When the carton is discharged from the machine it can conveniently be allowed to drop upon a suitable belt or conveyor 60 arranged beside the machine and adapted to carry the carton past a filling machine, not shown, to a second sealing machine in which the end which still remains open is sealed.

Each carton as it is filled is carried by the conveyor 60 to the second sealing machine which folds in and glues together the flaps $a$, $b$ and $c$. This second machine, shown at the left hand end of Figs. 1 and 2, is similar in principle to that heretofore described, differing therefrom only in detail. On a base 61 is mounted a pedestal 62, shorter than the pedestal 2 on account of the fact that the cartons are adapted to be received and carried at the level of the conveyor instead of above the conveyor as in the first machine. On the pedestal, as best shown in Fig. 3, is supported an annular track 63 similar to the track 3. Arranged within the track is a circular table 64 rotatable about a cylindrical post or shaft 65. On the table are a series of radial shafts 66 of which there are six as in the other machine. Each shaft is provided with a shoe 67 resting on the annular track and with a L-shaped arm 68 on the free end thereof. Each of the brackets carries a carton holder 69 connected to the bracket in precisely the same manner as the form or holder 9 in the other machine. A horizontal main shaft 70 is supported by the pedestal near the base thereof. Beside the pedestal is a vertical shaft 71 the lower end of which is geared to the main shaft by means of gearing 72 while on the upper end is a pinion 73 meshing with a gear wheel 74 on the under side of the table. The main shaft is driven in any suitable way as, for example, by transmission mechanism, not shown, driven by a suitable pulley 75. In the other machine, heretofore described, the parts 701, 711, 712 and 751 correspond to the aforesaid parts 70, 71, 72 and 75. On the post 65 is a cam track 76 similar to the track 45 in the other machine. This cam track overlies rollers 77 on the inner ends of hinged arms 78 which carry presser plates 79 on their outer ends; the presser plates having on top thereof anti-friction rollers 80.

In order to permit adjustments to be made of the parts of the machine above the base, I support the cylindrical post 65 in such a manner that it may be moved up and down, causing the same to rest at its lower end upon the upper end of a screw 81 passing through a stationary bar or yoke 82. By turning the screw in one direction, the post may be raised and by turning it in the opposite direction the post may be lowered.

The carton holders in the second machine differ from those in the other because in the one case the carton must be supported from the exterior while in the other it is supported from the interior. The carton holder 69 consists of a box-like structure of the same size and shape as the filled carton, open at the top and at the outwardly-directed side, thus permitting the carton to be entered into the holder by a lateral movement and permitting the unsealed flaps to project out of the top of the holder. One of the sides, 84, namely the leading side during the travel of the holder up to the discharge point, is hinged at its inner edge, as indicated at 85, to the holder; the hinged joint being preferably spaced at some distance outwardly from the corner between the wall 84 and the adjacent wall so that when the wall 84 is swung outwardly it will move bodily away from a carton in the holder or, in other words, will increase the width of the holder at all points. A spring 86, acting on the hinged wall of the holder, tends constantly to maintain it in what may be termed its closed position. Each hinged wall is provided with a finger 87 extending from the same past the hinged joint toward the center of the machine, these fingers being adapted to engage suitable stops, as will hereinafter be explained, for the purpose of opening the holders. Whenever one of the holders comes into a position in which its two side walls lie at right angles to the conveyor 60, that is when its outer open side is directly facing the conveyor, the finger 87, as indicated in Figs. 3, 14 and 15, strikes a stationary stop 88, causing the hinged side or wall to swing away from the remainder of the holder and thus make the effective inlet or mouth to the holder much wider than the carton to be received. After the carton has been inserted in the holder, as will hereinafter be described, the continued travel of the table carries the holder past the stop 88 so that the movable wall swings in and engages with the carton, causing the latter to be firmly gripped in the holder. The carton is now carried forward through a gluing device 90 identical with that heretofore explained, the two end flaps $a$ and $b$ being folded inwardly and the two side flaps $c$ and $d$ being folded outwardly and being supplied with glue on their upwardly-directed faces. Rails 91 and 92, together with a deflecting disc or wheel 93, corresponding to the rails 33 and 34 and the deflecting wheel or disc 32 in the other machine, cause the two side flaps to be folded inwardly and down upon the two end flaps. If it be desired to assist the springs which constantly tend to rock the holders into upright positions, which I do in the other machine, with the wheel or disc 35 at the time of folding in the fourth flap, an alternative device in the form of a comparatively strong leaf spring 94 lying underneath the rail 91 may be employed; this leaf spring being so positioned that when the carton is pushed outwardly by the wheel or disc 93, the spring 94 is stressed and, as soon as the carton has passed the wheel or disc, this spring assists the spring on the holder to swing the holder back underneath the rail 92. The carton continues to travel under the rail 92 for some distance just as the carton travels under the rail 34 in the other machine. Just before the carton passes out from underneath the rail 92, the corresponding presser plate 79 drops down so as to be in position instantly to engage with the top of the carton when it emerges from underneath the rail and thus prevent the flaps from opening up due to their own resiliency. The carton, with the presser plate overlying the same, then passes underneath a presser rail 95 which may be identical with the rail 46 in the other machine and be supported in exactly the same way, with the result that the flaps will be held tightly pressed together long enough to permit the glue to take a preliminary set.

After the carton has passed beyond the presser rail 95 it is ready to be discharged from the machine and, as was the case after the first end of the carton had been sealed, I prefer to turn the carton upside-down so that the end which has just been sealed will bear the weight of the carton and its contents. This I accomplish by providing each of the radial shafts 66 with a pinion 96 adapted to mesh in turn with two racks 97 and 98 lying just within the annular track 63 which is provided with depressions 99 and 100 opposite the two racks. As each pinion reaches the rack 97, it is rotated by the same, causing the corresponding holder also to be rotated. The depression 99 in the track provides a clearance which will permit the guide shoe 67 to make half a turn. When the second rack 98 is reached, the holder is given another half turn so as to restore it to its carton-receiving position. In other words, each holder is turned through a complete revolution in two steps of 180 degrees each, just as in the case of the other machine. After the holder has been turned upside-down the carton may drop out of the open bottom thereof upon a suitable conveyor 101 which will carry it away. In order to insure that the carton will not remain in the holder due to being gripped too tightly to be able to drop out, I fasten to the annular track or any other suitable stationary support, a stop 102 in such a position that just as the holder completes the first step of its rotary movement, the finger 87 on the movable wall will strike against this stop and will swing the wall outwardly, thus opening the holder and removing all restraining influence which might prevent the carton from freely dropping down out of the holder.

As heretofore stated, the mechanism for folding in two of the flaps and spreading the other two in order that glue may be applied to the latter is the same as that heretofore explained. The swinging arm 24, carrying the finger for folding in the rear or trailing flap, is shown in Fig. 2, being operated by a crank 26 to which is attached one end of a connecting rod 105 corresponding to the connecting rod 27. The lower end of this connecting rod, as shown in Figs. 1, 3 and 4, extends into proximity to the main shaft 70 on which is fixed a disc 106 having in one vertical face thereof a continuous groove 107 concentric with the shaft. This groove is flattened for a short distance as indicated at 108. The connecting rod has a loop 109, as best shown in Fig. 4, embracing the shaft, the loop permitting the connecting rod to move radially of the shaft in the direction of the length of the connecting rod and permitting the shaft to rotate within the loop. On the loop is a cam roll 110 projecting into the cam groove. Therefore, as the shaft rotates, the connecting rod will remain stationary as long as the cam roll lies in the curved portion of the groove but will be given a quick downward movement when the cam roll enters the flat portion of the groove. The cam is of course so positioned on the shaft that the downward movement of the connecting rod, and consequently the downward movement of the flap folding finger, occurs at just the instant when one of the carton holders is carrying a carton under the plate which makes the first fold. The connecting rod 27 in the other machine is driven in precisely the same way as the rod 105.

One of the important features of my invention consists in the mechanism for feeding the filled cartons from the conveyor 60 into the second sealing machine. Mechanism of this kind must be so organized that a carton will not be fed to the sealing machine unless the carton be in exactly the right position properly to enter a holder in the machine. I accomplish this result by controlling the feed mechanism in such a manner that it will remain inactive, until a carton has reached a predetermined point whereupon the feed mechanism will be brought into play to transfer the carton from the conveyor to a holder in the sealer. Therefore if no filled cartons are being delivered, the sealer will simply run idle while the machine is in operation. Furthermore, if a carton holder reaches a receiving point at a time when the oncoming carton could not be squarely aligned with it but might remain somewhat out of alignment so as to strike against one of the edges of the holder instead of entering the holder, the feed mechanism will remain inactive and the holder will pass on empty so as to permit the carton to be properly positioned to enter the following holder. This feature of my invention is best illustrated in Figs. 3 and 13 to 17 inclusive. The conveyor 60 extends for some distance past a plane passing through the same at right angles thereto and containing the axis of rotation of the sealing machine. Extending across the top of the conveyor is a stop bar 112 so positioned that when the conveyor carries a carton up to the same, a vertical plane at right angles to the conveyor and containing the axis of rotation of the sealer will pass exactly through the center of the carton. Therefore, if one of the holders 69 lies with its open side directly opposite the carton, the carton may be pushed off the conveyor into the holder. As heretofore explained, the movable wall of the carton is now swung outwardly as shown in Figs. 14 and 15, so as to leave an entrance into the holder much wider than the carton. The stop bar is preferably hinged to a stationary support at what may be called its rear end, as indicated at 113, being held in its normal position extending at right angles to the conveyor, by means of a spring 114. Therefore, in the event of some accident which would prevent a carton from being fed from the conveyor to the sealer, the oncoming cartons could push that carton against the stop with sufficient force to swing the stop out of the way and permit the carton to be ejected; a curved rail 115 extending from a point above the conveyor near the free end of the stop so as to lie between an ejected carton and the sealer and prevent the ejected carton from interfering with the sealer. The cartons are moved from the conveyor into the holders by means of a pusher bar 116 whose axis is in a vertical plane arranged at right angles to the conveyor and containing the axis of rotation of the sealer; the bar having at its front end a plate 117 of approximately the width and height of a carton so that pressure will be distributed up over one entire side of the carton while it is being pushed off the conveyor into a holder. The plate 117 has a rearwardly-extending flange 118 at the edge directed toward the oncoming cartons. This flange is provided with a horizontal slot 119. In the cove or angle formed between the pusher plate and its flange is mounted a dog 120 having a nose 121 which is adapted to project through the slot. A light spring 122 tends to hold the dog pressed against the inner face of the flange with the nose projecting through the slot. At the rear edge of the conveyor is placed a stationary stop 123 in such a position that when the pusher is in its forward position as shown in Fig. 15, the nose of the dog will drop in front of the stop and thus hold the pusher plate against being retracted from a position near the front edge of the conveyor, that is the edge nearest the sealer. The dog is in such a position that an oncoming carton carried by the conveyor will strike the same and, under certain conditions, will push the nose of the dog back into the slot so as to free the pusher device. A tension spring 124 arranged between the plate 117 and a stationary part 125 tends constantly to retract the pusher device into the position shown in Fig. 14, wherein the pusher plate lies wholly on one side of the path of movement of a carton on the conveyor. The cartons on the conveyor are preferably caused to travel between stationary parallel guides 60<sup>a</sup> so that their positions transversely of the conveyor are always fixed. While the pusher device will be retracted by its spring at any time when the spring is left free to act, it must be moved through its working stroke positively and in definite time relation to the movements of the sealer. To this end I have connected the pusher rod to the free end of one arm 126 of a bell crank lever which is pivotally supported at its elbow, as indicated at 127, on a part 128 of the stationary frame. The arm 126 is approximately vertical while the other arm, 129, of the lever is approximately horizontal and lies above and parallel to the main shaft 70. To the free end of the arm 129 of the bell crank lever is attached one end of a connecting rod 130, the other end of which is provided with a closed elongated loop 131 surrounding the main shaft. On the main shaft is a cam 132 and on the lower end of the loop is a laterally-projecting lug 133 lying in the path of the cam. It will be seen that as the main shaft rotates, the cam will strike the lug once during each revolution of the main shaft and will force the lug and therefore the connecting rod down. This causes the vertical arm of the bell crank lever to be moved in the clockwise direction as it appears in Fig. 3, namely in the direction to perform a working stroke. I prefer so to construct the parts that the nose of the dog, which preferably has a square face abutting against a corresponding surface on the stop, cannot be pushed into a release position from the position shown in Fig. 15, that is, while engaging the stop, without the exertion of a considerably greater pressure than that required to overcome the resistance of the light spring acting on the dog. In other words, while the parts are in the positions illustrated in Fig. 15, a carton may be carried up to the pusher device by the conveyor and, although it engages with the locking dog, it will not release the dog but will come to rest and allow the conveyor to slip along underneath it. However, the pusher device is not at the extreme end of its working stroke while it is being held against retraction on account of the engagement of the dog with the stop, as shown in Fig. 15, but is in a slightly retracted position. Therefore, just before a holder in the sealer reaches the receiving position, namely when the parts are in the positions illustrated in Fig. 13, the cam engages with the lug 133 and pushes it down slightly. The result is that the pusher rod is given a slight forward movement to bring it to the end of its working stroke, thus carrying the nose of the holding dog away from its stop. Only a slight pressure is now necessary to force the dog into release position and the carton whose movement may have been arrested by the dog will again begin to travel with the conveyor and will push the dog back so that as soon as the cam has passed the co-operating lug, the retracting spring is left free to carry the pusher device back to the position shown in Fig. 14. By the time that the carton holder travels from the position shown in Fig. 13 to that shown in Fig. 14, the actuating cam will have almost completed another revolution so that the pusher device will be driven through a quick working stroke; the carton in the meantime having been carried along by the conveyor so as to lie in front of the pusher device, and the carton will therefore be moved by the latter into the holder during such working stroke. The cycle can be clearly understood from Figs. 13, 14 and 15. Thus in Fig. 15 the carton shown in dotted lines has been brought into position to trip the catch when the pusher device has been given the slight forward movement to the position shown in Fig. 13. In Fig. 14 the pusher device has been retracted and the carton has been carried by the conveyor in front of the same so that immediately thereafter the carton will be pushed into the holder as shown in full lines in Fig. 15.

As another safety factor, in order to prevent possible injury to accidental jamming of the cartons in the feed mechanism, I prefer to make the connection between the bell crank lever and the pusher rod such that the bell crank lever may, under abnormal conditions, oscillate without moving the rod. To this end I place a spring between the bell crank lever and the pusher rod, the spring being strong enough to give the connection the requisite rigidity during normal operation, but permitting the pusher rod to stand still while the bell crank lever is moving through a working stroke, in case the pusher device encounters an obstruction. In the arrangement shown, I have pivoted to the upper end of the arm 126 of the bell crank lever a bar 135 which extends rearwardly parallel with the pusher rod and has its rear end bent at right angles, as indicated at 136; the pusher rod extending freely through the part 136; and the strong spring 137 being placed around the pusher rod with one end engaging the part 136 and the other end engaging a collar 138 adjustable on the rod. It will therefore be seen that if something should happen which would make it impossible for the pusher rod to push a filled carton ahead of it off the conveyor, the forward movement of the upper end of the vertical arm of the bell crank lever would simply produce a compression of the spring 137, thus avoiding danger of breaking or damaging any of the mechanism.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In a machine of the character described, a support, a holder for a carton the end of which is to be sealed mounted on said support so as to be capable of rotating thereon to turn it upside down, sealing mechanism, means for moving said support to carry the holder past said sealing mechanism with said end of the carton directed upwardly, and means for turning said holder on the support to position it upside-down to remove the carton.

2. In a machine of the character described, a horizontal member rotatable about a vertical axis, a series of holders for cartons one end of each of which is to be sealed distributed in a circle about the axis of said member, sealing mechanism in the path of said holders, means for causing each holder to pass through said sealing mechanism with the end of the carton to be sealed directed upwardly, and means for thereafter turning each holder upside-down.

3. In a machine of the character described, a rotatable member, a series of holders for cartons one end of each of which is to be sealed distributed in a circle about the axis of said member, sealing mechanism in the path of said holders, means for causing each holder to pass through said sealing mechanism with the end of the carton to be sealed directed upwardly; means for turning each holder upside-down at a predetermined point after passing the sealing mechanasim, and means for again bringing each holder into an upright position after it has passed said predetermined point.

4. In a machine of the character described, a rotatable table, radial shafts carried by said table, a carton holder on the outer end of each shaft, an annular stationary track adjacent to the plane of travel of said shafts, each shaft having a shoe resting on said track and preventing the shaft from rotating about its own axis, a pinion fixed to each shaft, and a short stationary rack adapted to be engaged by said pinions to cause said shafts to be rotated about their own axes at a predetermined point in their travel, said track having a depression so located and of such a size as to provide clearance for the shoe on each shaft when the pinion on that shaft reaches said rack.

5. In a machine of the character described, a member rotatable about a vertical axis, a horizontal shaft carried by said member and rotatable about its own axis, a carton holder carried by said shaft, an annular track arranged adjacent to the path of travel of said shaft and having its center at said vertical axis, sealing mechanism, said shaft having thereon a shoe engaging with the track to prevent the rotation of the holder while the holder is passing the sealing mechanism, said track having therein at points reached by said shaft after the holder has passed said sealing mechanism separated depressions adapted to provide clearance for the shoe when the shaft is rotated, and means for causing said shaft to be given a partial rotation when the shoe thereon comes opposite each of said depressions.

6. In a machine of the character described, a rotatable table, radial shafts carried by said table, a carton holder on the outer end of each shaft, an annular stationary track adjacent to the plane of travel of said shafts, each shaft having thereon a shoe resting on said track and preventing the shaft from rotating about its own axis, said track having therein a depression so located and of such a size as to provide clearance for the shoe on each shaft and permit each shaft to be rotated when it reaches said depression, and means for turning each shaft about its own axis when it reaches such depression.

7. In a machine of the character described, a rotatable table, radial shafts carried by said table, a carton holder on the outer end of each shaft, an annular stationary track adjacent to the plane of travel of said shafts, each shaft having thereon a shoe resting on said track and preventing the shaft from rotating about its own axis, said track having therein a depression so located and of such a size as to provide clearance for the shoe on each shaft and permit each shaft to be rotated when it reaches said depression, and means for turning each shaft through an angle of 180 degrees when it reaches said depression.

8. In a machine of the character described, a rotatable table, radial shafts carried by said table, a holder on the outer end of each shaft, an annular stationary track adjacent to the plane of travel of said shafts, each shaft having a shoe resting on said track and preventing the shaft from rotating about its own axis, means for turning each shaft through an angle of 180 degrees when it reaches a predetermined point in its travels, and means for turning it through a further angle of 180 degrees at a second predetermined point, said track being provided with depressions at said predetermined points of such size and shape as to provide clearance for the shoes during the rotation of the shafts.

9. In a machine of the character described, a rotatable table, radial shafts carried by said table, a holder on the outer end of each shaft, an annular stationary track adjacent to the plane of travel of said shafts, each shaft having a shoe resting on said track and preventing the shaft from rotating about its own axis, a pinion fixed to each shaft, and two short stationary racks arranged to be engaged in succession by each pinion to cause the corresponding shaft to be rotated about its own axis, said track having therein depressions so located and of such a size as to provide clearance for each shoe while its shaft is being rotated by the coaction of the pinion with the racks.

10. In a machine of the character described, a movable carrier, a holder for a carton mounted on the carrier so as to be movable transversely of the path of travel of the holder, stationary rails arranged on opposite sides of the holder parallel with the line of travel thereof and at such an elevation that they will engage with the projecting flaps of a carton in the holder in the vicinity of the bases of such flaps, and means for causing said holder to be moved laterally in one direction and then in the other direction as the holder passes said rails, so as to cause first one of the aforesaid flaps and then the other to be folded inwardly across the end of the carton.

11. In a machine of the character described, a movable carrier, a holder for a carton mounted on the carrier so as to be movable transversely of the path of travel of the holder, stationary rails arranged on opposite sides of the holder parallel with the line of travel thereof and at such an elevation that they will engage with the projecting flaps of a carton in the holder in the vicinity of the bases of such flaps, a deflecting device for causing the holder to be moved laterally when it is opposite one of said rails so as to cause one of the flaps to be folded inwardly by said rail, and means for moving the holder laterally in the opposite direction when it comes opposite the other rail so as to cause the latter rail to fold in the other of the aforesaid flaps.

12. In a machine of the character described, a movable carrier, a holder for a carton mounted on the carrier so as to be movable transversely of the path of travel of the holder, stationary rails arranged on opposite sides of the holder parallel with the line of travel thereof and at such an elevation that they will engage with the projecting flaps of a carton in the holder in the vicinity of the bases of such flaps, one of said rails being in advance of the other, a deflector in position to engage the holder when it comes opposite the first rail and move it laterally underneath that rail so as to cause one of the said flaps to be folded inwardly, and a spring arranged between the holder and the carrier in such position as to be stressed when the holder is moved laterally by said deflector and to exert the energy stored up therein to move the holder underneath the second rail after the deflector has been passed and thus cause the second of said flaps to be folded inwardly.

13. In a machine of the character described, a rotatable carrier, a carton holder hinged at one end to the carrier so as to lie approximately parallel with the axis of rotation and have a swinging movement in a plane containing said axis, a spring arranged between the holder and the carrier tending constantly to maintain the holder in a predetermined position relatively to the carrier, and means acting on said holder at a predetermined point in the rotation of the carrier to swing said holder out of said position against the resistance of said spring.

14. In a machine of the character described, a carrier rotatable about a vertical axis, a shaft extending radially of the carrier, an L-shaped bracket secured at one end at one of its arms to the outer end of said shaft, a carton holder mounted on the other arm of said bracket so as to lie approximately at right angles to said shaft, means for holding said shaft against rotation during a portion of each revolution of the carrier, and means for turning the shaft through an angle of 180 degrees when it reaches a predetermined point.

15. In a machine of the character described, a carrier rotatable about a vertical axis, a shaft extending radially of the carrier, an L-shaped bracket secured at one end at one of its arms to the outer end of said shaft, a carton holder mounted on the other arm of said bracket so as to lie approximately at right angles to said shaft, means for holding said shaft against rotation during a portion of each revolution of the carrier, and means for turning the shaft through an angle of 180 degrees when it reaches a predetermined point and for turning it through another angle of 180 degrees when it reaches a second predetermined point.

16. In a machine of the character described, a carrier rotatable about a vertical axis, a shaft extending radially of the carrier, an L-shaped bracket secured at one end at one of its arms to the outer end of said shaft, a carton holder mounted on the other arm of said bracket so as to lie approximately at right angles to said shaft, the connection between the holder and the bracket being constructed and arranged to permit the holder to oscillate in a plane containing said vertical axis, means for preventing the rotation of said shaft during a portion of each revolution of the carrier, and means for turning the shaft during another portion of each revolution of the carrier.

17. In a machine of the character described, a rotatable carrier, a holder for a carton mounted on the carrier and constructed and arranged to support a carton with the flaps to be sealed directly upwardly, sealing mechanism in position to act on a carton in the holder as it is moved past the sealing mechanism by the carrier, a presser plate associated with each holder, means for positioning said presser plate on top of the sealed carton after it has passed the sealing mechanism, and a vertically-yieldable presser rail in position to engage with said plate and press it forcibly down on the carton.

18. In a machine of the character described, a holder adapted to support a rectangular carton with four end flaps directed upwardly, means for moving said carrier in a direction parallel with two of the flaps and at right angles to the other two flaps, a plate arranged just above the path of travel of the holder in position to engage the flap facing the same as the carton approaches the plate and fold that flap down on the carton, a finger, means for actuating said finger in proper time relation to the movement of the holder to cause it to fold in the rear flap before the rear flap reaches said plate and hold it folded down until the flap passes underneath the plate, means for applying glue to the inner faces of the two side flaps, two stationary rails beyond the last mentioned means arranged parallel with each other at opposite sides of the path of travel of the holder and slightly above the top of the body of the carton in the holder, and means for causing the holder to be moved laterally so as to pass first underneath one of said rails to cause one of the side flaps to be folded in and then underneath the other rail to cause the other side flap to be folded in.

19. In a machine of the character described, a traveling support, a holder for a carton mounted on said support so as to be capable of rotating thereon to turn it upside down, and means cooperating with the holder to cause it alternately to occupy and remain for a time at rest in upright and inverted positions.

In testimony whereof, I sign this specification.

GEORGE HOEPNER.